(12) United States Patent  
Dounis et al.

(10) Patent No.: US 11,822,968 B2  
(45) Date of Patent: Nov. 21, 2023

(54) APPLICATION DELIVERY CONTROLLER PERFORMANCE CAPACITY ADVISOR

(71) Applicant: CITRIX SYSTEMS, INC., Fort Lauderdale, FL (US)

(72) Inventors: Ioannis Dounis, Magoula (GR); John Prevezanos, Magoula (GR); Thanasis Petrovas, Magoula (GR); Vassilis Tsogkas, Magoula (GR)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 17/584,018

(22) Filed: Jan. 25, 2022

(65) Prior Publication Data

US 2023/0221998 A1    Jul. 13, 2023

Related U.S. Application Data

(63) Continuation of application No. PCT/GR2022/000001, filed on Jan. 10, 2022.

(51) Int. Cl.
| | |
|---|---|
| *H04L 29/06* | (2006.01) |
| *G06F 9/445* | (2018.01) |
| *G06F 21/53* | (2013.01) |
| *G06F 11/00* | (2006.01) |
| *G06F 9/455* | (2018.01) |

(Continued)

(52) U.S. Cl.
CPC .............. *G06F 9/5044* (2013.01); *G06F 8/60* (2013.01)

(58) Field of Classification Search
CPC ........ G06F 9/5044; G06F 8/60; G06F 9/5055; G06F 9/5005; G06F 9/5038; G06F 9/5077; G06F 8/36; G06F 8/20; G06F 8/10; G06F 8/35; H04L 41/0843; H04L 41/0803; H04L 41/0806; H04L 67/34; H04L 41/0886; H04L 41/0846; H04L 67/10

See application file for complete search history.

(56) References Cited

U.S. PATENT DOCUMENTS

| | | | |
|---|---|---|---|
| 9,094,457 B2 * | 7/2015 | Julisch | ...................... G06F 8/60 |
| 2020/0021631 A1 * | 1/2020 | Koster | .................. H04L 5/0064 |
| 2021/0294664 A1 * | 9/2021 | Yu | .......................... G06F 9/5055 |

OTHER PUBLICATIONS

Jebbar et al., Regression Test Suite Reduction for Cloud Systems, 10 pages (Year: 2020).*

* cited by examiner

*Primary Examiner* — Thuy Dao (57) ABSTRACT

A method, a system, and a computer program product for executing a performance capacity analysis in a cloud application delivery controller computing environment and generating one or more recommendations for deployment of a computing solution. One or more deployment parameters associated with deploying of a first computing system in a plurality of first computing systems in a second computing system is received. The deployment parameters are defined by at least the second computing system. A list of first computing systems is generating using the received deployment parameters. Each first computing system in the generated list is executed in a test environment and test results associated with execution of each first computing system in the generated list are determined. At least one first computing system in the generated list is selected for deployment upon determining that the test results associated with executing of the first computing system match the deployment parameters.

18 Claims, 6 Drawing Sheets

(51) Int. Cl.
*G06F 9/50* (2006.01)
*G06F 8/60* (2018.01)

APPLICATION DELIVERY CONTROLLER PERFORMANCE CAPACITY ADVISOR

CROSS REFERENCE TO RELATED APPLICATIONS

This application is a continuation of and claims priority to the International Patent Application No. PCT/GR2022/000001, filed Jan. 10, 2022 and entitled "Application Delivery Controller Performance Capacity Advisor," the disclosure of which is incorporated herein by reference in its entirety.

BACKGROUND

Computing systems have become increasingly complex and typically involve a multitude of computing processes, applications, communications components, etc.. To ensure efficient operation of such computing systems, various aspects of such computing processes, applications, communication components, etc. may need to be taken into account. Application delivery controllers (ADC), a computer network device that may be deployed in a datacenter, which may also be a part of an application delivery network (ADN), may be used to perform various common tasks, such as, load balancing, traffic optimization and management, security, application firewall, etc. However, conventional systems do not provide for a deployment of such application delivery controller in an effective and efficient manner.

SUMMARY

In some implementations, the current subject matter relates to a computer implemented method for executing a performance capacity analysis in a cloud application delivery controller computing environment and generating one or more recommendations for deployment of a computing solution. The method may include receiving, using at least one processor, one or more deployment parameters associated with deploying of a first computing system in a plurality of first computing systems in a second computing system. The deployment parameters may be defined by at least the second computing system. The method may further include generating a list of one or more first computing systems in the plurality of first computing systems using the received deployment parameters, executing each first computing system in the generated list of one or more first computing systems in a test environment and determining one or more test results associated with the execution of each first computing system in the generated list, and selecting at least one first computing system in the generated list of first computing systems for deploying upon determining that the test results associated with executing of the first computing system match the deployment parameters.

In some implementations, the current subject matter can include one or more of the following optional features. One or more first computing systems in the plurality of first computing systems may include at least one of the following: an application delivery controller system, an application delivery controller cloud system, and any combination thereof.

In some implementations, one or more deployment parameters may include at least one of the following: a geographical region parameter, a software application traffic parameter, a software licensing requirement parameter, a deployment cost parameter, an application performance parameter, a deployment redundancy parameter, a security parameter, and any combination thereof.

Generation of the list of first computing systems may include excluding one or more first computing systems from the generated list upon one or more first computing systems failing to meet the one or more deployment parameters.

In some implementations, the test executing may include executing each first computing system in the generated list of one or more first computing systems in the test environment using one or more historical data associated with deployment of one or more first computing systems in at least another computing system. The selecting may include selecting at least one first computing system in the generated list of first computing systems for deploying upon determining that one or more test results associated with executing of at least one first computing system match the historical data. The matching of the test results and the historical data may be performed using at least one predetermined threshold associated with one or more received deployment parameters.

In some implementations, the method may also include deploying the selected first computing system in the second computing system.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

To address the deficiencies of currently available solutions, one or more implementations of the current subject matter provide for an ability to perform an analysis of a performance capacity in an application delivery controller (ADC) computing environment, such as, for example, a cloud ADC computing environment.

An application delivery controller provides load balancing, application acceleration, secure sockets layer (SSL) termination, and security with an access to various applications. ADC can be delivered using hardware appliances, virtual appliances, and/or software-only load balancers. ADC provides security and access to applications at various times, including peak times, as well as application deployment. ADC can be used to quickly and securely scale up various application services based on demand and/or consolidate network-based services. Application delivery controllers' functionalities include caching, compression, intrusion detection, web application firewalls, SSL/TLS offload, microservices, etc. and can be further used for SSL offloading, visibility, application analytics, multi-cloud support, TCP optimizations, rate shaping, web application firewalls, etc.

An application delivery controller involves a load balancer for managing traffic flows to servers. The load balancer can distribute incoming requests across a plurality of servers (e.g., based on server capacity, type of requested content, client location, etc.). In some cases, ADC can perform caching of various content to accelerate delivery of such content and/or to reduce server loads. The ADC can also compress larger files (e.g., audio, video, etc.) for faster delivery, reduction of consumed network bandwidth, etc. As stated above, it can also be used as an SSL endpoint for various connection, which can also speed up delivery of content, operation of servers, etc. Moreover, the ADC optimizes end-user performance, application deployment, application accelerations, application security, etc. In a typical setting, the ADC can be positioned between one or more enterprise web servers and end users so that it is able to manage application traffic. It can include a firewall to provide security.

The ADCs have been used for delivering applications to end-users for more than 20 years. Traditionally available hardware-based form factors, performance benchmarking, etc. are significant parts of ADC provisioning and some of the important key factors to consider, to provide an ADC solution, tailored to customer requirements, in a cloud environment.

In some implementations, the current subject matter relates to a system and a method for creating solution proposals in a self-service manner by taking as input customer-specific requirements.

Figure 1:
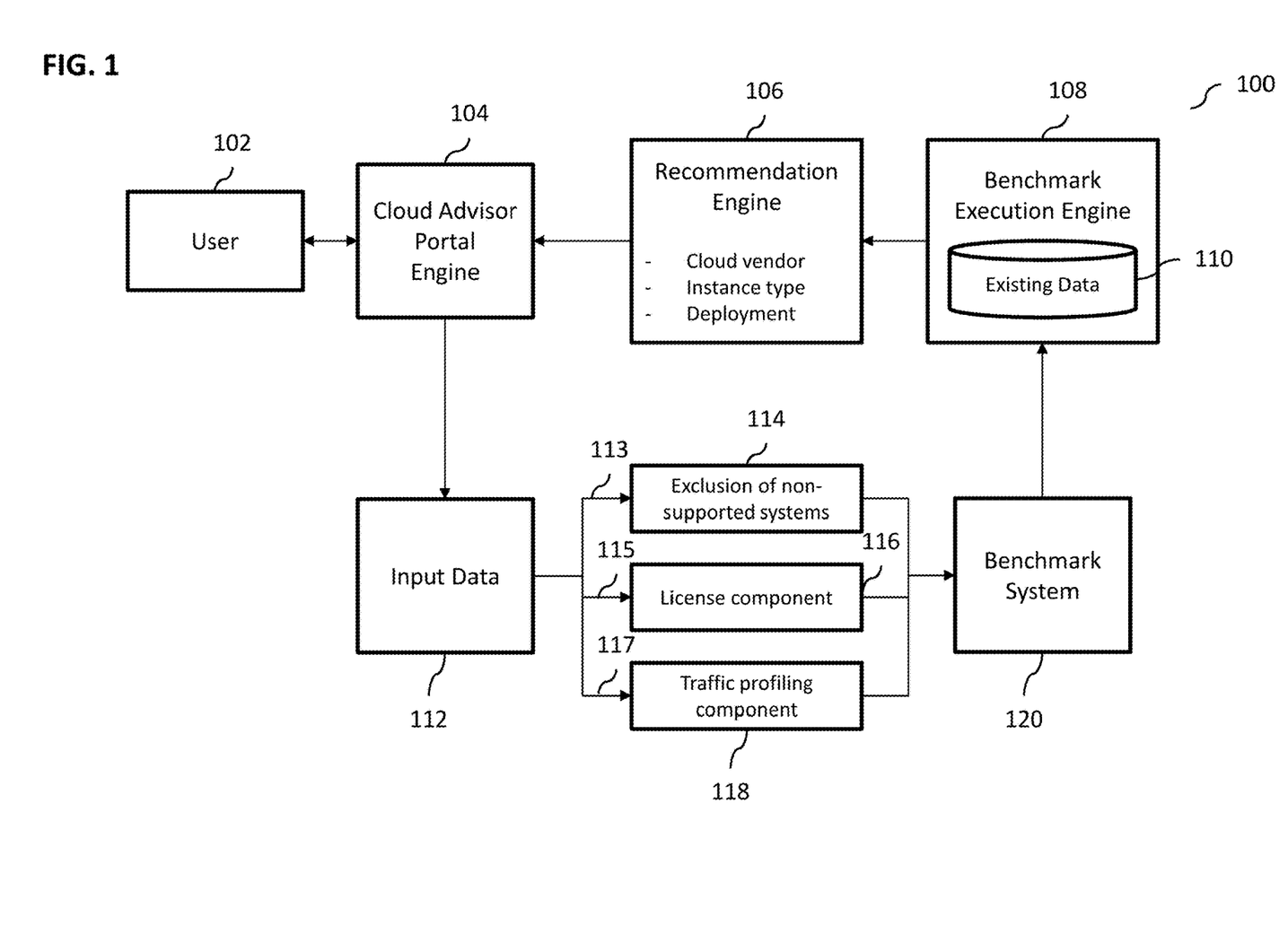
FIG. 1 illustrates an exemplary computing system that may be configured to execute an analysis of a performance capacity in an application delivery controller (ADC) computing environment and generate one or more ADC deployment solutions, such as, for example, a cloud ADC computing environment, according to some implementations of the current subject matter.

FIG. 1 illustrates an exemplary computing system 100 that may be configured to execute an analysis of a performance capacity in an application delivery controller (ADC) computing environment and generate one or more ADC deployment solutions, such as, for example, a cloud ADC computing environment, according to some implementations of the current subject matter. The system 100 and/or one or more of its components may be configured to be implemented in a cloud ADC computing environment and/or other be included in a computing environment that includes an ADC.

The system 100 may include a client advisor portal engine 104, recommendation engine 106, benchmark execution engine 108, a benchmark system component 120, as well as various data components, such as an input data component 112, component indicating exclusion of non-supported systems 114, a license component 116, and a traffic profiling component 118. The benchmark execution engine 108 may also include an existing data storage component 110. The system 100 may be accessed by one or more users 102. The elements 104-120 may include one or more computing elements, which may, for example, as discussed below, include one or more processors, one or more servers, one or more computing engines, one or more memory and/or storage locations, one or more databases, etc. The computing components of the system 100 may refer to one or more pieces of software code that may be configured to perform a particular function, one or more pieces and/or one or more sets of data (e.g., data unique to a particular user and/or data available to a plurality of users) and/or configuration data used to create, modify, etc. one or more software functionalities to a particular user 102 and/or a set of users.

The computing system 100 may be configured to be implemented in one or more servers, one or more databases, a cloud storage location, a memory, a file system, a file sharing platform, a streaming system platform and/or device, and/or in any other platform, device, system, etc., and/or any combination thereof. One or more components of the system 100 may be communicatively coupled using one or more communications networks. The communications networks can include at least one of the following: a wired network, a wireless network, a metropolitan area network ("MAN"), a local area network ("LAN"), a wide area network ("WAN"), a virtual local area network ("VLAN"), an internet, an extranet, an intranet, and/or any other type of network and/or any combination thereof.

The components of the system 100 may include any combination of hardware and/or software. In some implementations, such components may be disposed on one or more computing devices, such as, server(s), database(s), personal computer(s), laptop(s), cellular telephone(s), smartphone(s), tablet computer(s), and/or any other computing devices and/or any combination thereof. In some implementations, these components may be disposed on a single computing device and/or can be part of a single communications network. Alternatively, or in addition to, the components may be separately located from one another.

In some implementations, the cloud advisor portal engine 104 may be configured to receive (e.g., from user(s) 102) one or more deployment requirements that may be processed into an input data 112, using which one or more input parameters 113, 115, 117 relating to various aspects of user's computing systems, applications (e.g., hardware, software, etc. configurations), communications, etc. may be generated and transmitted for analysis by the system 100 to generate recommendations (e.g., computing solution(s)) to the user 102. In some implementations, exemplary, non-limiting groups of input parameters may be configured to include at least one of the following: a geographic input parameter that may identify particular geographic location(s) (e.g., region, country, city, etc.) of interest to the user, a user's annual budget input parameter identifying various user's budgetary allocations, performance requirement(s) input parameter(s) (e.g., bandwidth, storage capacity, etc.), a redundancy parameter and/or any other input parameters and/or groups of input parameters associated with user's computing systems, applications, communications, etc.

In some example, non-limiting implementations, geographic location input parameter (e.g., input parameter 113 as shown in FIG. 1) may be configured to have a higher importance and/or priority over other input parameters. This input parameter may be used by the system 100 to filter out locations that do not meet user's requirements for user's computing systems, applications, communications, etc. For example, cloud provider services may vary among regions and may impose limitations for computing system, application, etc. deployment(s). In some cases, the user 102 may be interested in a computing solution for a specific geographic region (e.g., country, location, etc.) only, such as, due to, for example, regulatory compliance reasons and/or to ensure that cloud resources are located close to user's customers, without jeopardizing latency. The geographic input parameter 113 may be supplied to exclude any computing systems, applications, communications, etc. that might not be supported for a geographic region identified by the geographic input parameter 113, and thus, not included in the proposed/recommended computing solution.

The annual (or any other type of) budget for a computing solution input may also bear a substantial importance to the user 102. A user's budget may include one or more ADC computing, software, hardware, communication, etc. licenses along with costs associated with deployment of any recommended computing solutions, such as for example, for an all-inclusive offer that may be proposed to the user 102. For example, licensing and/or cloud resources may be limited by various computing, networking, performance, etc. requirements and vice versa. Thus, any dependency among these may affect cost optimization. Any optimization criteria may include a balanced solution between networking performance, ADC licensing, cloud and/or any other costs. A maximum networking performance without exceeding the user's budget may be an optimal solution.

The performance requirement input may include any actual traffic demands of the user's computing systems, applications, communications, etc. Thus, various aspects, requirements, etc. of the user's computing systems, applications, communications, etc. may affect the budget accordingly. For example, SSL applications may consume extra resources that may raise the costs of any proposed solution. Hence, performance may be limited by the annual budget and a determination may need to be made which of the above input factors may be more critical for user's needs. Thus, the budget and performance requirement(s) may be presented as a combined input parameter 115 to for the purposes of determining any licensing requirements by the licensing component 116.

Any performance requirements may also be separately provided as input parameter 117 to the traffic profiling component 118 to analyze requirements, profiles, etc. (e.g., throughput, security, requests per second (RPS), transactions per second (TPS), etc.) of traffic associated with the proposed solutions. The traffic profiling component 118 may be configured to be a subsystem of the system 100 and may allow generation of predetermined and/or specific traffic requirement(s) ("traffic mix") as well as a specification for how such traffic mix may interact with various ADC's features. A traffic mix may include a set of traffic parameters (e.g., percentages), each representing how much of network traffic that is load balanced and/or served through the ADC may be processed through a specific feature and/or features combination. Some exemplary features may include at least one of the following: load balancing, transport layer security (TLS) offloading, application firewall, authoritative DNS, and/or any others, and/or any combination thereof. In some implementations, one or more predetermined traffic profiles (e.g., having a predetermined traffic mix) may be used. By way of a non-limiting example, a traffic profile setting that may be generated by the traffic profiling component 118 may include at least one of the following: load balancing: 50%, load balancing and TLS offloading: 30%, load balancing and application firewall: 0%, load balancing and application firewall and TLS offloading: 15%, authoritative DNS: 5%, and/or any other settings, and/or any combination thereof. The percentages in the above examples signify that a percentage per traffic volume (e.g., expressed as % of total hypertext transfer protocol (HTTP) requests) may be divided using traffic load-balancing subsets and/or standalone services with, for instance, specific features enabled. In some implementations, traffic profiling component 118 may be configured to emulate one or more user requests to load balancing servers and/or services configured on the same ADC device (not shown in FIG. 1), manipulate traffic until desired traffic mix is achieved to ensure maximum capacity of either ADC software/ADC license and/or other imposed limits (e.g., cloud provider limits).

In some implementations, additional input parameters may include a redundancy requirement of any proposed solution and/or any aspects thereof. For example, when unexpected scenarios occur, redundancy requirement may be used to ensure that any downtime associated with the proposed solution is as short as possible while keeping any of user's applications (e.g., business, accounting, etc.) online. The deployment of any proposed solution may be configured to deliver redundant capabilities if a critical incident (e.g., a disaster, a server crash, a malicious attack, etc.) occurs so that operations are uninterrupted. One or more high availability and/or cluster setups may be used to ensure continuity of operations. Further, any network redundancy costs may vary depending on a particular proposed solution.

Once the input parameters are processed by the components 114, 116, and 118, they may be provided to the benchmark system component 120. In some exemplary implementations, the benchmark system component 120 may be configured to analyze the traffic mix by traffic profiling component 118, one or more license options (generated by the license component 116 based using budget and performance requirements), a list of any excluded computing systems, applications, deployments, instances, types/sizes thereof, etc. (generated by the component 114 using any geographical regions identified in the input data 112), and/or any other parameters, data, etc. Using this data, the benchmark system component 120 may be configured to generate one or more testbed proposed solutions for one or more cloud systems in the identified geographic regions. The testbed proposed solutions may include one or more traffic generator computing components and any ADC components.

The testbed proposed solution may be provided by the benchmark system component 120 to the benchmark execution engine 108. The benchmark execution engine 108 may be configured to execute the testbed proposed solution to test it. In particular, the engine 108, during execution, may be configured to determine and/or analyze one or more performance metrics in view of the requested traffic mix and/or any ADC specifications that satisfy user's defined budgets and/or performance requirements. The benchmark execution engine 108 may be configured to use existing and/or historical data 110 (if available) that may match any of the requirements associated with the user's requests for a proposed solution. In some implementations, one or more thresholds associated with the historical data 110 may be used to assess performance of the testbed proposed solution. The thresholds may be used to prevent comparison of the testbed proposed solution to an outdated performance metrics that may be stored in the historical data 110 (e.g., performance data from 3 years ago might not be used to compare performance of the testbed proposed solution, etc.). Alternatively, or additionally, one or more predetermined thresholds may be used to ensure that the testbed proposed solution meets requirements of the user (e.g., traffic throughput of X Gbps for application Y).

Upon completion of testing of the testbed proposed solution, the benchmark execution engine 108 may determine whether or not the testbed proposed solution has passed requirements associated with the user's request, the engine 108 may be configured to provide the testbed proposed solution to the recommendation engine 106. Otherwise, the engine 108 may be configured to indicate that the testbed proposed solution failed to meet the requirements of the user (e.g., no system exists that meets such requirements). Alternatively, or in addition to, the engine 108 may provide results of its execution to the engine 106, which, in turn, may determine any recommended proposed solutions that may fully, partially, and/or not meet the requirements of the user.

The recommendation system engine 106 may be configured to accept an input regarding benchmarks/actual performance tests from the benchmark execution engine 108 and generate an output that may be indicative of one or more proposed solutions to the user (e.g., via the cloud advisor portal component 104). By way of a non-limiting example, the engine 106 may be configured to, as part of the proposed solutions indicate to the user at least one of the following: ADC deployment types, a list of public and/or private cloud providers that may meet user's requirements, any cloud instance types, available geographical regions, identification of any performance tradeoffs and/or alternatives, identification of one or more deployment types that may meet the user's requirements, and/or any other data.

In some implementations, an ADC may be setup using multiple form factors and/or configurations which may affect any performance measurements and/or total cost. Exemplary ADC deployment types may include at least one of the following: a standalone (SA) deployment (e.g., a single ADC virtual appliance may be used), a high availability (HA) deployment (e.g., more than one ADC virtual appliances may be used), a cluster deployment (e.g., three or more virtual appliances may be used, which may be configured to serve traffic in a particular pattern (e.g., tandem)). The engine 106 may be configured to use any performance data obtained from the benchmark execution engine 108 and/or any cost data (e.g., associated with one or more applicable cloud vendors) to determine eventual performance of each ADC deployment type.

The recommendation engine 106 may also identify tradeoffs that may be associated with each deployment of ADC. For example, the standalone ADC deployment may have a lower cost associated with it, but a high risk of loss (e.g., in the event of a disaster, failure, etc.). The high availability ADC deployment (e.g., having two ADC virtual appliance nodes, where one appliance node may be redundant with the other) may have medium cost associated with it, however, such deployment may be limited to loss of only one ADC virtual appliance node (i.e., if both are lost, the entire deployment fails). The clustering ADC deployment may have high redundancy and a higher cost associated with it, but may be better protected against failure.

Further, each public and/or private cloud provider may offer multiple options with regard to system specifications and/or configuration regarding system ADC instances that may be setup. Cost and performance associated with such setups may depend on ADC instance type(s) making selection of the most appropriate instance type difficult. The recommendation system engine 106 may be configured to analyze this information to present to the user with various multiple alternate scenarios for each of instance type.

Additionally, the recommendation system engine 106 may be configured to factor in information about deployment of recommended system in specific geographical regions when recommending particular solutions to the user. The information may relate to specific laws related to data processing to specific locations (e.g., thereby excluding certain regions from feasible options, while also making some others a viable choice (e.g., different European regions may have lower costs and/or better performance during peak hours)).

In some implementations, the recommendation system engine 106 may be configured to generate a list of proposed solutions that may be ranked in a way that satisfies one or more requirements of the user (e.g., in view of the most up to date performance results and/or cost). The engine 106 may also generate one or more alternatives, indicating tradeoffs that could be made depending on user's preference (s). For example, some users may consider spending more resources, in order to obtain an improved performance, while other users may prefer to reduce costs with a minimal reduction on performance/availability. As a result, the recommendation system engine 106 may also offer a few potential (secondary) options that might not strictly adhere to the user requirements.

Figure 2:
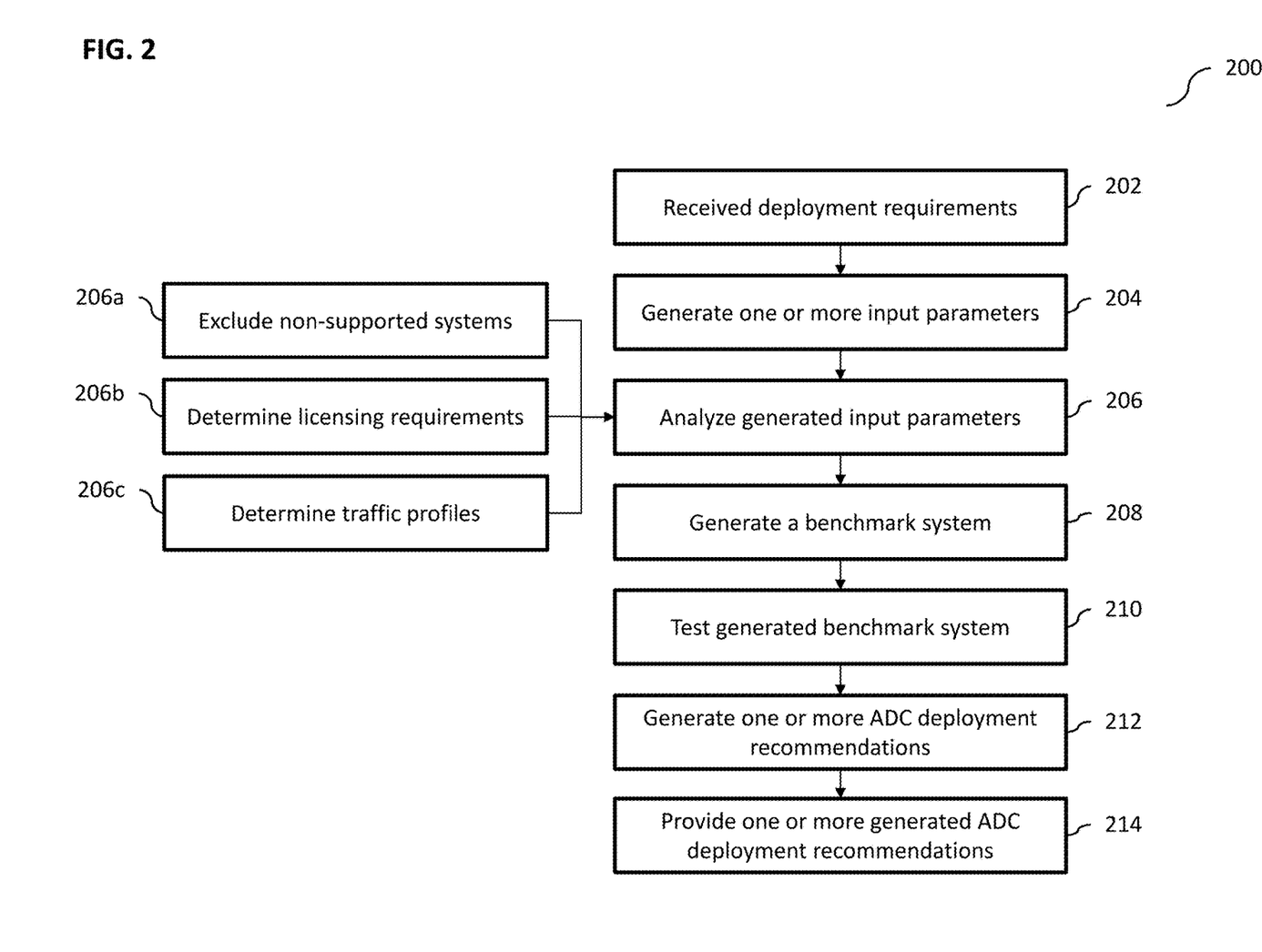
FIG. 2 illustrates an exemplary process for analyzing a performance capacity in an application delivery controller (ADC) computing environment and generate one or more ADC deployment solutions, according to some implementations of the current subject matter.

FIG. 2 illustrates an exemplary process 200 for analyzing a performance capacity in an application delivery controller (ADC) computing environment and generate one or more ADC deployment solutions, according to some implementations of the current subject matter. The process 200 may be configured to be executed by one or more components 104-120 of the system 100 shown in FIG. 1.

At 202, one or more deployment requirements may be received from the user 102. The requirements may be transmitted to the system 100 using client advisor portal engine 104 (e.g., which may include one or more interfaces that may be used for transmission of such requirements). The requirements may relate to specifics of user's computing systems, applications (e.g., hardware, software, etc. configurations), communications, etc., geographical regions where deployment of an ADC may need to occur, budgetary constraints, performance requirements, redundancy requirements, and/or any other requirements.

At 204, the system 100 may be configured to use the received input data and generate one or more input parameters 113, 115, 117. As stated above, the input parameters 113, 115, 117 may relate to various aspects of user's computing systems, applications (e.g., hardware, software, etc. configurations), communications, etc. and may include at least one of the following: a geographic input parameter that may identify particular geographic location(s) (e.g., region, country, city, etc.) of interest to the user, a user's annual budget input parameter identifying various user's budgetary allocations, performance requirement(s) input parameter(s) (e.g., bandwidth, storage capacity, etc.), a redundancy parameter and/or any other input parameters and/or groups of input parameters associated with user's computing systems, applications, communications, etc.

At 206, the generated input parameters may be analyzed to determine one or more aspects that may need to be considered for deployment of a particular ADC system. As part of this analysis, the system 100 may be configured to determine whether there are any deployments that may be excluded from any proposed solutions, at 206a. This may include ADC deployments that may, for example, be too expensive (e.g., not meeting budgetary constraints), outside of geographical regions requested by the user, not meeting performance requirements, etc. Moreover, the system 100 may be configured to determine whether there are any licensing requirements associated with any proposed solutions, at 206b. The licensing requirements may be determined in view of any performance requirements and/or budgetary constraints identified by the user as part of the received input. Additionally, the system 100 may also analyze any performance requirements, traffic profiles, etc. (e.g., throughput, security, etc.), at 206c.

At 208, a benchmark system may be generated using benchmark system component 120. The benchmark system may be generated based on the analysis of the input parameters. The benchmark system may be tested (e.g., executed in a test environment) in view of the requirements of the user. The benchmark execution engine 108 may test the generated system. In some implementations, one or more historical metrics data may be used to compare performance of the benchmark system to prior existing ADC deployment systems to determine whether it meets the requirements of the user. One or more thresholds may be used to ascertain performance of the benchmark system.

Once the benchmark system has been tested, the recommendation engine 106 may be configured to generate one or more recommendations for proposed ADC deployment solutions. The solutions may or may not match one, some, and/or all requirements of the user. Alternatively, or in addition to, the recommended solutions might not exactly match the requirements of the user but may still be useful to the user and/or used by the user in view of the user's requirements. The recommended proposed solutions may be provided via the cloud advisor portal engine 104 to the user 102, at 214.

Figure 3:
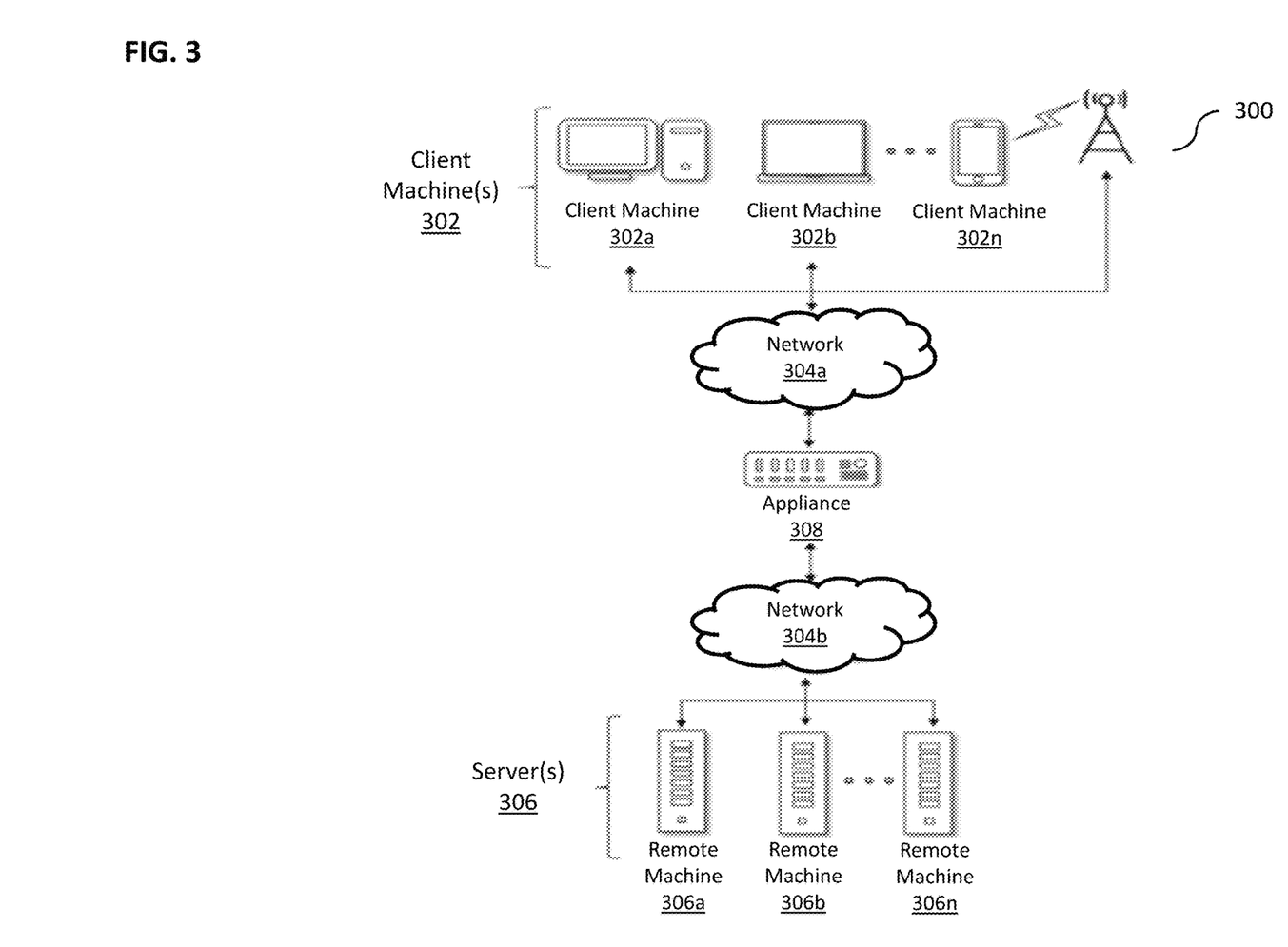
FIG. 3 illustrates an example of a network environment, according to some implementations of the current subject matter

FIG. 3 illustrates an example of a network environment 300, according to some implementations of the current subject matter. Referring to FIGS. 1-3, the network environment 300, in which various aspects of the disclosure may be implemented, may include one or more clients 302a-302n, one or more remote machines 306a-306n, one or more networks 304a and 304b, and one or more appliances 308 installed within the network environment 300. The clients 302a-302n communicate with the remote machines 306a-306n via the networks 304a and 304b.

In some example implementations, the clients 302a-302n may communicate with the remote machines 306a-306n via an appliance 308. The illustrated appliance 308 is positioned between the networks 304a and 304b, and may also be referred to as a network interface or gateway. In some example implementations, the appliance 308 may operate as an application delivery controller (ADC) to provide clients with access to business applications and other data deployed in a datacenter, the cloud, or delivered as Software as a Service (SaaS) across a range of client devices, and/or provide other functionality such as load balancing and/or the like. In some example implementations, multiple appliances 308 may be used, and the appliance(s) 308 may be deployed as part of the network 304a and/or 304b.

The clients 302a-302n may be generally referred to as client machines, local machines, clients, client nodes, client computers, client devices, computing devices, endpoints, or endpoint nodes. One or more of the clients 302a-302n may implement, for example, the client device 130 and/or the like. The remote machines 306a-306n may be generally referred to as servers or a server farm. In some example implementations, a client 302 may have the capacity to function as both a client node seeking access to resources provided by a server 306 and as a server 306 providing access to hosted resources for other clients 302a-302n. The networks 304a and 304b may be generally referred to as a network 304. The network 304 including the networks 304a and 304b may be configured in any combination of wired and wireless networks.

The servers 306 may include any server type of servers including, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a server executing an active directory; a cloud server; or a server executing an application acceleration program that provides firewall functionality, application functionality, or load balancing functionality.

A server 306 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft internet protocol telephone; an application for streaming video and/or audio; an application for facilitating real-time-data communications; a hypertext transfer protocol (HTTP) client; a file transfer protocol (FTP) client; an Oscar client; a Telnet client; or any other set of executable instructions.

In some example implementations, a server 306 may execute a remote presentation services program or other program that uses a thin-client or a remote-display protocol to capture display output generated by an application executing on a server 306 and transmit the application display output to a client 302.

In yet other example implementations, a server 306 may execute a virtual machine, such as the first virtual machine and/or the second virtual machine, to provide, for example, to the user at a client device, access to a computing environment such as the virtual desktop. The virtual machine may be managed by, for example, a hypervisor (e.g., a first hypervisor, a second hypervisor, and/or the like), a virtual machine manager (VMM), or any other hardware virtualization technique within the server 306.

In some example implementations, the network 304 may be a local-area network (LAN), a metropolitan area network (MAN), a wide area network (WAN), a primary public network, and/or a primary private network. Additional implementations may include one or more mobile telephone networks that use various protocols to communicate among mobile devices. For short-range communications within a wireless local-area network (WLAN), the protocols may include 1002.11, Bluetooth, and Near Field Communication (NFC).

Figure 4:
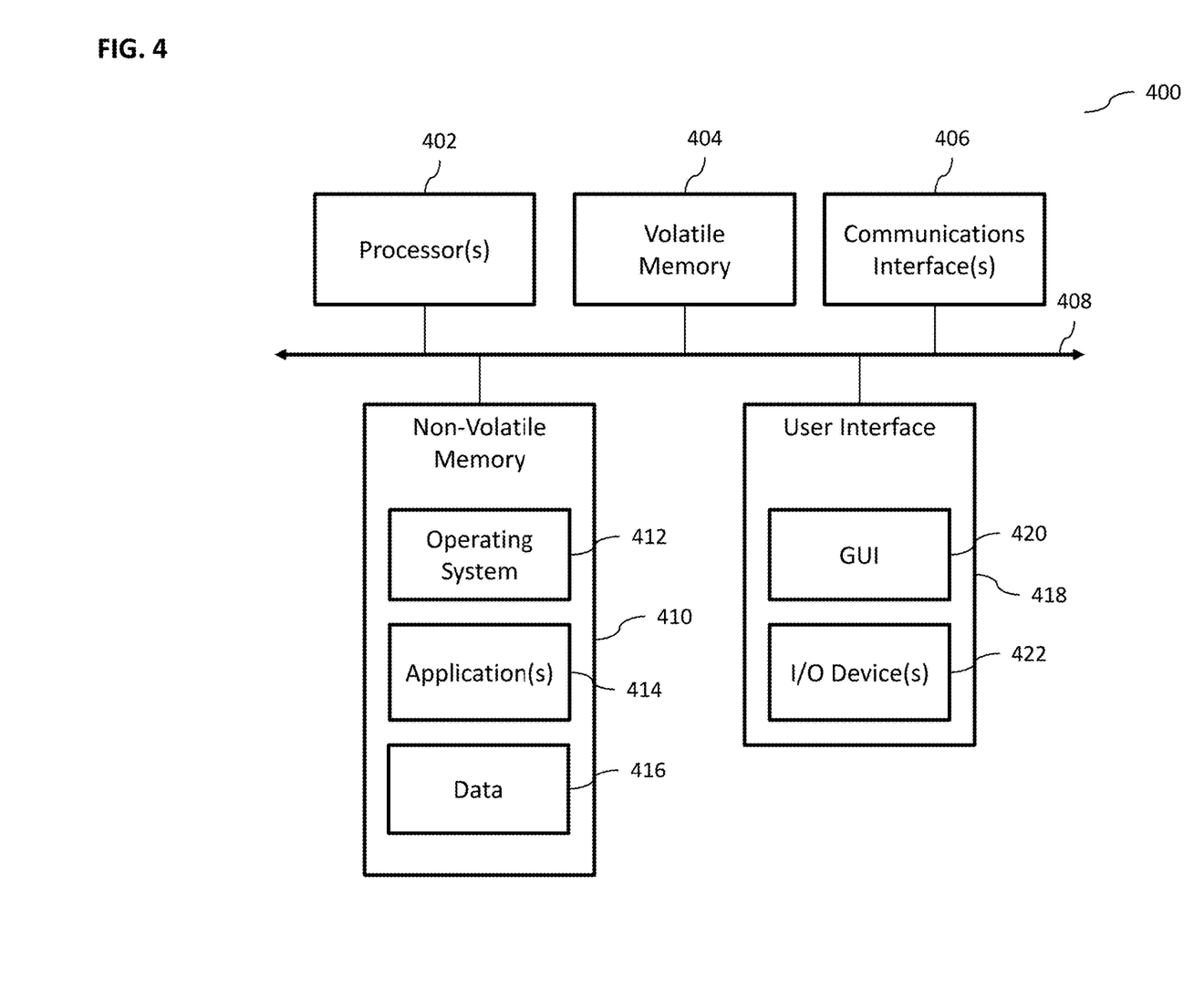
FIG. 4 depicts a block diagram illustrating an example of a computing device, according to some implementations of the current subject matter.

FIG. 4 depicts a block diagram illustrating an example of a computing device 400, in accordance with some example implementations. Referring to FIGS. 1-4, the computing device 400 may be useful for practicing an implementation of the system 100 and analysis engine 120.

As shown in FIG. 4, the computing device 400 may include one or more processors 402, volatile memory 404 (e.g., RAM), non-volatile memory 410 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 418, one or more communications interfaces 406, and a communication bus 408. The user interface 418 may include a graphical user interface (GUI) 420 (e.g., a touchscreen, a display, and/or the like) and one or more input/output (I/O) devices 422 (e.g., a mouse, a keyboard, and/or the like). The non-volatile memory 410 may store an operating system 412, one or more applications 414, and data 416 such that computer instructions of the operating system 412 and/or applications 414 are executed by the processor(s) 402 out of the volatile memory 404. Data may be entered using an input device of the GUI 420 or received from I/O device(s) 422. Various elements of the computing device 400 may communicate via the communication bus 408. The computing device 400 as shown in FIG. 4 is shown merely as an example, and may be implemented by any computing or processing environment and with any type of machine or set of machines that may have suitable hardware and/or software capable of operating as described herein.

The processor(s) 402 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some example implementations, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some example implementations, the "processor" may be one or more physical processors or one or more "virtual" (e.g., remotely located or "cloud") processors.

The communications interfaces 406 may include one or more interfaces to enable the computing device 400 to access a computer network such as a local area network (LAN), a wide area network (WAN), a public land mobile network (PLMN), and/or the Internet through a variety of wired and/or wireless or cellular connections.

As noted above, in some example implementations, one or more computing devices 400 may execute an application on behalf of a user of a client computing device (e.g., clients 302), may execute a virtual machine, which provides an execution session within which applications execute on behalf of a user or a client computing device (e.g., clients 302), such as a hosted desktop session (e.g., a virtual desktop), may execute a terminal services session to provide a hosted desktop environment, or may provide access to a computing environment including one or more of: one or more applications, one or more desktop applications, and one or more desktop sessions in which one or more applications may execute.

Figure 5:
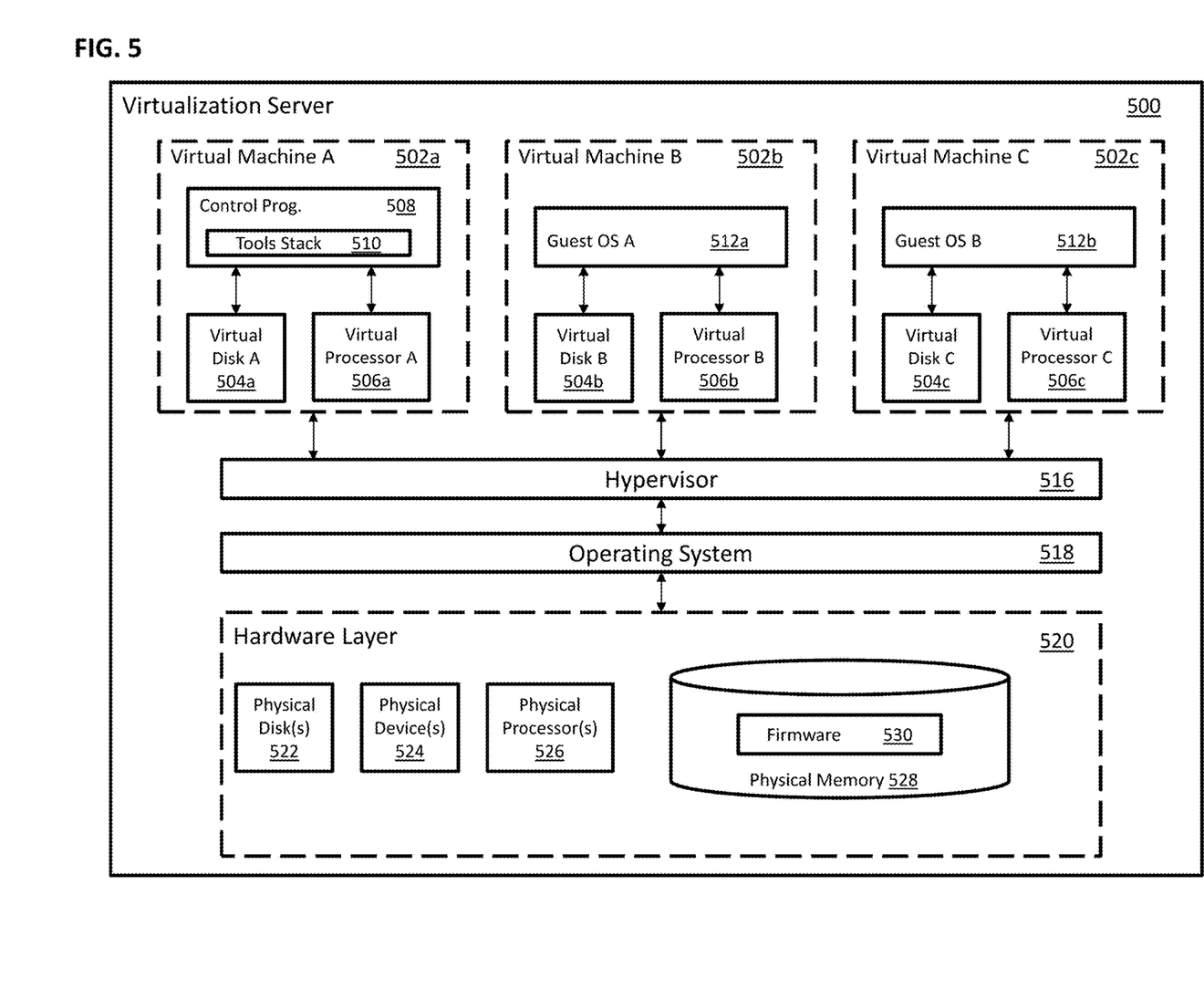
FIG. 5 illustrates a high-level architecture of an example of a virtualization system for implementing the computing system shown in FIG. 1, according to some implementations of the current subject matter.

FIG. 5 illustrates a high-level architecture of an example of a virtualization system for implementing the computing system 100, in accordance with some example implementations. As shown in FIG. 5, the virtualization system may be a single-server or multi-server system, or a cloud system, including at least one virtualization server 500 configured to provide virtual desktops and/or virtual applications to one or more client access devices 302a-c. A desktop (or a virtual desktop) may refer to a graphical environment (e.g., a graphical user interface) or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per physical device) or virtual (e.g., many instances of an OS running on a single physical device). Each application may be executed on a local device, or executed on a remotely located device (e.g., remoted).

Virtualization server 500 may be configured as a virtualization server in a virtualization environment, for example, a single-server, multi-server, or cloud computing environment. Virtualization server 500 illustrated in FIG. 5 may be deployed as and/or implemented by one or more implementations of server 306 illustrated in FIG. 3 or by other known computing devices. Included in virtualization server 500 is hardware layer 520 that may include one or more physical disks 522, one or more physical devices 524, one or more physical processors 526, and one or more physical memories 528. In some implementations, firmware 530 may be stored within a memory element in physical memory 528 and be executed by one or more of physical processors 526. Virtualization server 500 may further include operating system 518 that may be stored in a memory element in physical memory 528 and executed by one or more of physical processors 526. Still further, hypervisor 516 may be stored in a memory element in physical memory 528 and be executed by one or more of physical processors 526. Presence of operating system 518 may be optional.

Executing on one or more of physical processors 526 may be one or more virtual machines 502A-C(generally, 502). Each virtual machine 502 may have virtual disk 504A-C and virtual processor 506A-C. In some implementations, first virtual machine 502A may execute, using virtual processor 506A, control program 508 that includes tools stack 510. Control program 508 may be referred to as a control virtual machine, Domain 0, Dom0, or other virtual machine used for system administration and/or control. In some implementations, one or more virtual machines 502B-C may execute, using virtual processor 506B-C, guest operating system 512A-B (generally, 512).

Physical devices 524 may include, for example, a network interface card, a video card, an input device (e.g., a keyboard, a mouse, a scanner, etc.), an output device (e.g., a monitor, a display device, speakers, a printer, etc.), a storage device (e.g., an optical drive), a Universal Serial Bus (USB) connection, a network element (e.g., router, firewall, network address translator, load balancer, virtual private network (VPN) gateway, Dynamic Host Configuration Protocol (DHCP) router, etc.), or any device connected to or communicating with virtualization server 500. Physical memory 528 in hardware layer 520 may include any type of memory. Physical memory 528 may store data, and in some implementations may store one or more programs, or set of executable instructions. FIG. 5 illustrates an implementation where firmware 530 is stored within physical memory 528 of virtualization server 500. Programs or executable instructions stored in physical memory 528 may be executed by the one or more processors 526 of virtualization server 500.

Virtualization server 500 may also include hypervisor 516. In some implementations, hypervisor 516 may be a program executed by processors 526 on virtualization server 500 to create and manage any number of virtual machines 502. Hypervisor 516 may be referred to as a virtual machine monitor, or platform virtualization software. In some implementations, hypervisor 516 may be any combination of executable instructions and hardware that monitors virtual machines 502 executing on a computing machine. Hypervisor 516 may be a Type 2 hypervisor, where the hypervisor executes within operating system 518 executing on virtualization server 500. Virtual machines may then execute at a layer above hypervisor 516. In some implementations, the Type 2 hypervisor may execute within the context of a user's operating system such that the Type 2 hypervisor interacts with the user's operating system. In other implementations, one or more virtualization servers 500 in a virtualization environment may instead include a Type 1 hypervisor (not shown). A Type 1 hypervisor may execute on virtualization server 500 by directly accessing the hardware and resources within hardware layer 520. That is, while Type 2 hypervisor 516 accesses system resources through host operating system 518, as shown, a Type 1 hypervisor may directly access all system resources without host operating system 518. A Type 1 hypervisor may execute directly on one or more physical processors 526 of virtualization server 500, and may include program data stored in physical memory 528.

Hypervisor 516, in some implementations, may provide virtual resources to guest operating systems 512 or control programs 508 executing on virtual machines 502 in any manner that simulates operating systems 512 or control programs 508 having direct access to system resources. System resources can include, but are not limited to, physical devices 524, physical disks 522, physical processors 526, physical memory 528, and any other component included in hardware layer 520 of virtualization server 500. Hypervisor 516 may be used to emulate virtual hardware, partition physical hardware, virtualize physical hardware, and/or execute virtual machines that provide access to computing environments. In still other implementations, hypervisor 516 may control processor scheduling and memory partitioning for virtual machine 502 executing on virtualization server 500. Examples of hypervisor 516 may include those manufactured by VMWare, Inc., of Palo Alto, California; Xen Project® hypervisor, an open source product whose development is overseen by the open source XenProject.org community; Hyper-V®, Virtual Server®, and Virtual PC® hypervisors provided by Microsoft Corporation of Redmond, Washington; or others. The virtualization server 500 may execute hypervisor 516 that creates a virtual machine platform on which guest operating systems 512 may execute. When this is the case, virtualization server 500 may be referred to as a host server. An example of such a virtualization server is Citrix Hypervisor® provided by Citrix Systems, Inc., of Fort Lauderdale, Florida.

Hypervisor 516 may create one or more virtual machines 502B-C(generally, 502) in which guest operating systems 512 execute. In some implementations, hypervisor 516 may load a virtual machine image to create virtual machine 502. The virtual machine image may refer to a collection of data, states, instructions, etc. that make up an instance of a virtual machine. In other implementations, hypervisor 516 may execute guest operating system 512 within virtual machine 502. In still other implementations, virtual machine 502 may execute guest operating system 512.

In addition to creating virtual machines 502, hypervisor 516 may control the execution of at least one virtual machine 502. The hypervisor 516 may present at least one virtual machine 502 with an abstraction of at least one hardware resource provided by virtualization server 500 (e.g., any hardware resource available within hardware layer 520). In some implementations, hypervisor 516 may control the manner in which virtual machines 502 access physical processors 526 available in virtualization server 500. Controlling access to physical processors 526 may include determining whether virtual machine 502 should have access to processor 526, and how physical processor capabilities are presented to virtual machine 502.

As shown in FIG. 5, the virtualization server 500 may host or execute one or more virtual machines 502. Virtual machine 502 may be a set of executable instructions and/or user data that, when executed by processor 526, may imitate the operation of a physical computer such that virtual machine 502 can execute programs and processes much like a physical computing device. While FIG. 5 illustrates an implementation where virtualization server 500 hosts three virtual machines 502, in other implementations virtualization server 500 may host any number of virtual machines 502. Hypervisor 516 may provide each virtual machine 502 with a unique virtual view of the physical hardware, including memory 528, processor 526, and other system resources 522, 524 available to that virtual machine 502. The unique virtual view may be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 516 may create one or more unsecure virtual machines 502 and one or more secure virtual machines 502. Unsecure virtual machines 502 may be prevented from accessing resources, hardware, memory locations, and programs that secure virtual machines 502 may be permitted to access. In other implementations, hypervisor 516 may provide each virtual machine 502 with a substantially similar virtual view of the physical hardware, memory, processor, and other system resources available to virtual machines 502.

Each virtual machine 502 may include virtual disk 504A-C(generally, 504) and virtual processor 506A-C(generally 506.) Virtual disk 504 may be a virtualized view of one or more physical disks 522 of virtualization server 500, or a portion of one or more physical disks 522 of virtualization server 500. The virtualized view of physical disks 522 may be generated, provided, and managed by hypervisor 516. In some implementations, hypervisor 516 may provide each virtual machine 502 with a unique view of physical disks 522. These particular virtual disk 504 (included in each virtual machine 502) may be unique, when compared with other virtual disks 504.

Virtual processor 506 may be a virtualized view of one or more physical processors 526 of virtualization server 500. The virtualized view of physical processors 526 may be generated, provided, and managed by hypervisor 516. Virtual processor 506 may have substantially all of the same characteristics of at least one physical processor 526. Virtual processor 526 may provide a modified view of physical processors 526 such that at least some of the characteristics of virtual processor 506 are different from the characteristics of the corresponding physical processor 526.

Figure 6:
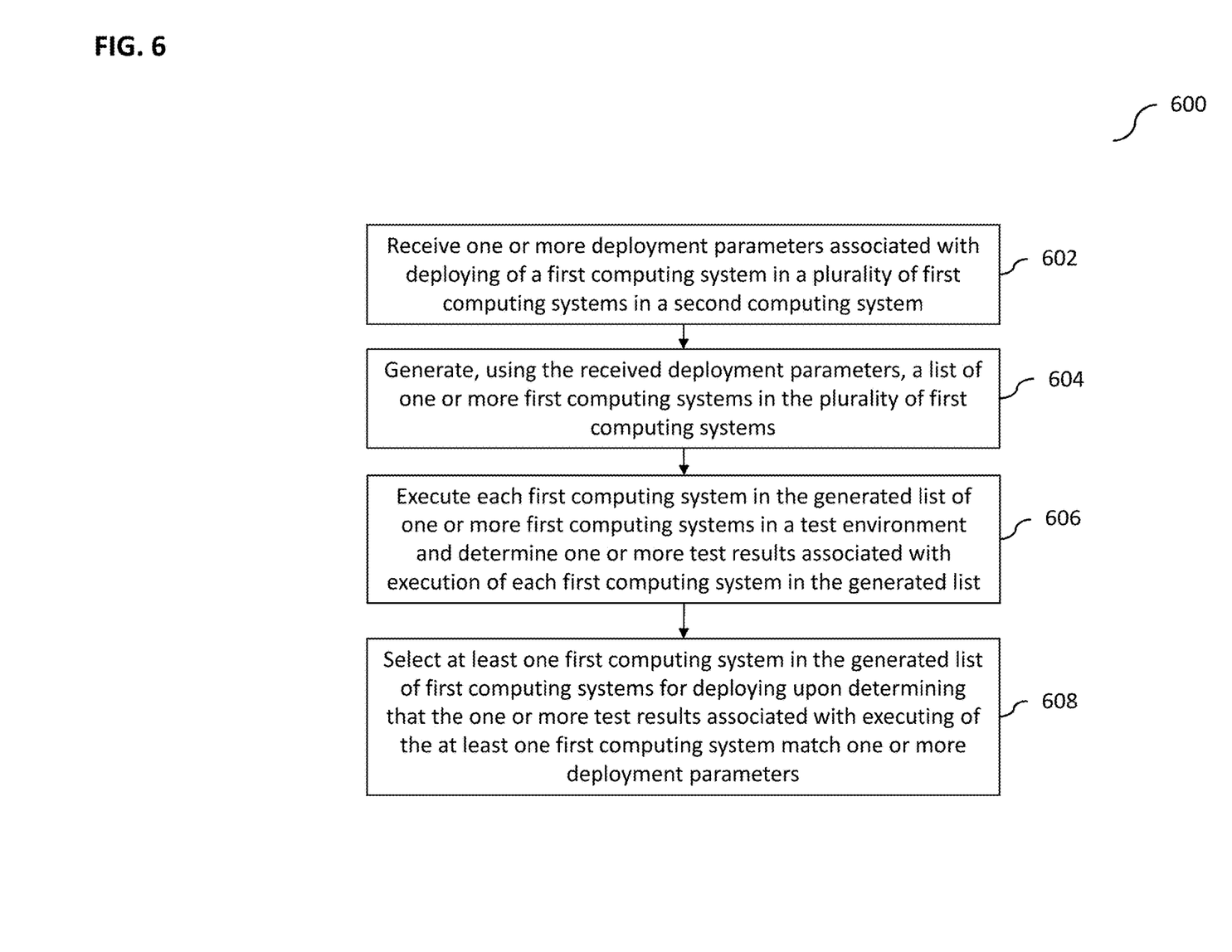
FIG. 6 illustrates an example of a method, according to some implementations of the current subject matter.

FIG. 6 illustrates an example of a method 600 for executing a performance capacity analysis in a cloud application delivery controller computing environment and generating one or more recommendations for deployment of a computing solution (e.g., an ADC solution), according to some implementations of the current subject matter. The method 600 may be performed by the system 100 shown in FIG. 1 using a process shown, for example, in FIG. 2.

At 602, the cloud advisory portal component of the system 100 (e.g., at least one processor) may receive one or more deployment parameters (e.g., geographical region, traffic requirements, performance requirements, budgetary costs, etc.) associated with deploying of a first computing system (e.g., an ADC in a cloud environment) in a plurality of first computing systems in a second computing system (e.g., user's 102 computing system). The deployment parameters may be defined by at least the second computing system (e.g., user 102 may supply the parameters).

At 604, the system 100 may be configured to generate a list of one or more first computing systems in the plurality of first computing systems using received deployment parameters. The deployment parameters may be analyzed by the input data component 112 to determine input parameters 113, 115, 117 (e.g., to exclude some system, determine licensing requirements, determine traffic/performance requirements, etc.) and generate one or more benchmark systems 120 for testing.

At 606, the benchmark execution engine 108 of the system 100 may be configured to test execute each first computing system (e.g., ADC system) in the generated list of first computing systems in a test environment (e.g., testbed execution) and determine one or more test results associated with the execution of each first computing system in the generated list. Testing may be performed to determine whether any of the generated benchmark systems match requirements of the user. Various historical data (e.g., prior deployments of ADC systems) may be used to determine whether any of benchmark systems may match such user requirements.

At 608, the recommendation engine 106 of the system 100 may be configured to select at least one first computing system (e.g., generated benchmark system) in the generated list of first computing systems for deploying upon determining that the test results associated with executing of the first computing system match one or more deployment parameters. The systems with matching results may be provided to the user 102 via the portal engine 104.

In some implementations, the current subject matter can include one or more of the following optional features. One or more first computing systems in the plurality of first computing systems may include at least one of the following: an application delivery controller system, an application delivery controller cloud system, and any combination thereof.

In some implementations, one or more deployment parameters may include at least one of the following: a geographical region parameter, a software application traffic parameter, a software licensing requirement parameter, a deployment cost parameter, an application performance parameter, a deployment redundancy parameter, a security parameter, and any combination thereof.

Generation of the list of first computing systems may include excluding one or more first computing systems from the generated list upon one or more first computing systems failing to meet the one or more deployment parameters.

In some implementations, the test executing may include executing each first computing system in the generated list of one or more first computing systems in the test environment using one or more historical data associated with deployment of one or more first computing systems in at least another computing system. The selecting may include selecting at least one first computing system in the generated list of first computing systems for deploying upon determining that one or more test results associated with executing of at least one first computing system match the historical data. The matching of the test results and the historical data may be performed using at least one predetermined threshold associated with one or more received deployment parameters.

In some implementations, the method may also include deploying the selected first computing system in the second computing system.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
receiving, using at least one processor, one or more deployment parameters associated with deploying of a first computing system in a plurality of first computing systems in a second computing system, the one or more deployment parameters being defined by at least the second computing system;
generating, using the at least one processor, a list of one or more first computing systems in the plurality of first computing systems based on the one or more deployment parameters;
executing, using the at least one processor, each first computing system in the list of one or more first computing systems in a test environment;
determining, using the at least one processor, one or more test results associated with the execution of each first computing system in the list;
determining, using the at least one processor, that the one or more test results associated with executing of at least one first computing system match the one or more deployment parameters by matching the one or more test results and one or more historical data using at least one predetermined threshold associated with the one or more deployment parameters; and
selecting, using the at least one processor, the at least one first computing system in the list of first computing systems for deployment.

2. The computer-implemented method of claim 1, wherein one or more first computing systems in the plurality of first computing systems comprise at least one of: an application delivery controller system, an application delivery controller cloud system, and any combination thereof.

3. The computer-implemented method of claim 1, wherein the one or more deployment parameters comprise at least one of: a geographical region parameter, a software application traffic parameter, a software licensing requirement parameter, a deployment cost parameter, an application performance parameter, a deployment redundancy parameter, a security parameter, and any combination thereof.

4. The computer-implemented method of claim 1, wherein generating comprises removing one or more first computing systems from the generated list upon the one or more first computing systems failing to meet the one or more deployment parameters.

5. The computer-implemented method of claim 1, wherein executing, using the at least one processor, the each first computing system in the list of one or more first computing systems in the test environment is based on using one or more historical data associated with deployment of one or more first computing systems in at least another computing system.

6. The computer-implemented method of claim 1, wherein using the at least one predetermined threshold for selecting the one or more historical data prevents usage of outdated performance metrics.

7. The computer-implemented method of claim 1, further comprising deploying the at least one first computing system in the second computing system.

8. A system comprising:
at least one programmable processor; and
a non-transitory machine-readable medium storing instructions that, when executed by the at least one programmable processor, cause the at least one programmable processor to perform operations comprising:
receiving, using at least one processor, one or more deployment parameters associated with deploying of a first computing system in a plurality of first computing systems in a second computing system, the one or more deployment parameters being defined by at least the second computing system;
generating, using the at least one processor, a list of one or more first computing systems in the plurality of first computing systems based on the one or more deployment parameters;
executing, using the at least one processor, each first computing system in the list of one or more first computing systems in a test environment;
determining, using the at least one processor, one or more test results associated with the execution of each first computing system in the list;
determining, using the at least one processor, that the one or more test results associated with executing of at least one first computing system match the one or more deployment parameters by matching the one or more test results and one or more historical data using at least one predetermined threshold associated with the one or more deployment parameters; and
selecting, using the at least one processor, the at least one first computing system in the list of first computing systems for deployment.

9. The system of claim 8, wherein one or more first computing systems in the plurality of first computing systems comprise at least one of: an application delivery controller system, an application delivery controller cloud system, and any combination thereof.

10. The system of claim 8, wherein the one or more deployment parameters comprise at least one of: a geographical region parameter, a software application traffic parameter, a software licensing requirement parameter, a deployment cost parameter, an application performance parameter, a deployment redundancy parameter, a security parameter, and any combination thereof.

11. The system of claim 8, wherein generating comprises removing one or more first computing systems from the list upon the one or more first computing systems failing to meet the one or more deployment parameters.

12. The system of claim 8, wherein executing, using the at least one processor, the each first computing system in the list of one or more first computing systems in the test environment is based on using one or more historical data associated with deployment of one or more first computing systems in at least another computing system.

13. The system of claim 12, wherein using the at least one predetermined threshold for selecting the one or more historical data prevents usage of outdated performance metric.

14. The system of claim 8, wherein the operations further comprise deploying the at least one first computing system in the second computing system.

15. A computer program product comprising a non-transitory machine-readable medium storing instructions that, when executed by at least one programmable processor, cause the at least one programmable processor to perform operations comprising:
receiving, using at least one processor, one or more deployment parameters associated with deploying of a first computing system in a plurality of first computing systems in a second computing system, the one or more deployment parameters being defined by at least the second computing system;
generating, using the at least one processor, a list of one or more first computing systems in the plurality of first computing systems based on the one or more deployment parameters;
executing, using the at least one processor, each first computing system in the list of one or more first computing systems in a test environment;
determining, using the at least one processor, one or more test results associated with the execution of each first computing system in the list;
determining, using the at least one processor, that the one or more test results associated with executing of at least one first computing system match the one or more deployment parameters by matching the one or more test results and one or more historical data using at least one predetermined threshold associated with the one or more deployment parameters; and
selecting, using the at least one processor, the at least one first computing system in the list of first computing systems for deployment.

16. The computer program product of claim 15, wherein one or more first computing systems in the plurality of first computing systems comprise at least one of: an application delivery controller system, an application delivery controller cloud system, and any combination thereof.

17. The computer program product of claim 15, wherein the one or more deployment parameters comprise at least one of: a geographical region parameter, a software application traffic parameter, a software licensing requirement parameter, a deployment cost parameter, an application performance parameter, a deployment redundancy parameter, a security parameter, and any combination thereof.

18. The computer program product of claim 15, wherein generating comprises removing one or more first computing systems from the list upon the one or more first computing systems failing to meet the one or more deployment parameters.

* * * * *